/ Patented Mar. 30, 1943

2,315,168

UNITED STATES PATENT OFFICE 2,315,168

METHOD OF PRODUCING LACTIC ACID ESTERS

George Gordon Urquhart, Cynwyd, Pa.

No Drawing. Application December 13, 1940, Serial No. 369,955

4 Claims. (Cl. 260—484)

My invention relates to a new process for the production of lactic acid esters. More particularly, my invention relates to an improved process for making glycerol lactates and lactic acid esters of dihydric and polyhydric alcohols. It has been shown in United States Patent No. 2,181,231 that glycerol esters of lactic acid can be made by esterifying glycerol with various proportions of lactic acid. The products thus obtained are glycerol monolactate, glycerol dilactate, glyceryl lactate and glycerol lactyllactates. These esters can be employed in the manufacture of alkyd resins and confer valuable properties to the coating compounds made therefrom. The aforementioned process has certain inherent disadvantages with respect to cost and purity of product. Lactic acid of sufficient purity costs more than either glycerol or phthalic anhydride and consequently lactic acid would not be used extensively or at all in producing 3-component alkyds because of this fact. Furthermore, technical grades of lactic acid contain protein and metallic impurities which tend to discolor the glycerol-lactic acid esters.

In my new process, I use neither lactic acid nor glycerol for the preparation of glycerol lactic acid esters. Instead, I prefer to use the intermediate chemicals leading to these two products. Thus, great economies in the cost of manufacture of alkyd resins can be effected. At the same time, my process leads to the production of lighter colored glycerol lactates.

In accordance with my invention, I condense 1,3 dichloropropanol-2 with an alkali metal or alkali earth salt of lactic acid. The 1,3 dichloropropanol-2 is obtained from propylene, a petroleum by-product, by high temperature halogenation and subsequent hypohalogenation. Sodium lactate and calcium lactate are readily obtained from lactic acid fermentation liquors by treatment with sodium carbonate or lime respectively. Solutions of these salts of lactic acid can be obtained in any desired purity in accordance with well established procedures.

When the alkali metal or alkali earth lactates are employed for the preparation of glycerol-lactic acid esters, in accordance with my invention, it is not essential to resort to expensive purification processes because unreactive impurities can be separated by filtration along with halide salt which is formed during the reaction. Such a purification step is not feasible when lactic acid is esterified directly. Lactic acid cannot be purified by distillation and in order to effect its purification it must be either converted to an ester e. g. methyllactate, or it must be converted to a lactide. Both of these processes are costly and time consuming.

The chemical reactions involved in the preparation of glycerol dilactate, in accordance with my invention, may be set forth as follows:

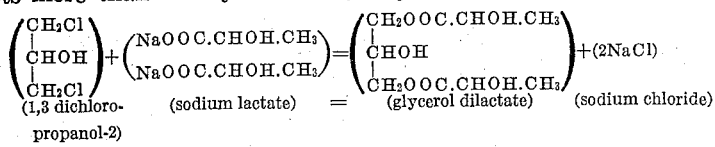

Instead of the sodium salt it is possible to use other alkali metal or alkali earth salts, such as potassium, calcium and barium lactates. Of these salts, I prefer to employ the sodium and calcium lactates, the calcium salt having the advantage of being bivalent and inexpensive, while the sodium salt reacts more readily than the calcium salt and involves no difficulty in removing the sodium chloride and other impurities from the reaction mass.

Glycerol lactate monochlorohydrin can be made in a similar fashion by condensing only one mole of sodium lactate with one mole of 1,3 dichloropropanol-2 to give substantial yields. It is then feasible to react the second halogen atom with alkali metal or alkali earth salts of other acids, such as adipic, ricinoleic and tartaric.

I have found that it is also practical to make glycerol lactates by condensing one mole of 1,3 dichloropropanol-2 with either one mole of calcium lactate or two moles of sodium lactate, plus one mole of lactic acid. This may be exemplified as follows:

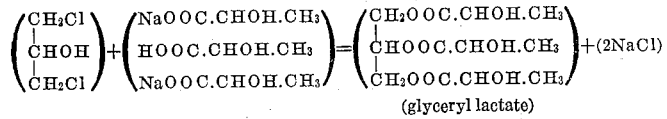

(glyceryl lactate)

In making the foregoing glyceryl lactate, it is not necessary to add the lactic acid per se. It is only necessary to react one mole of 1,3 dichloropropanol-2 with three moles of sodium lactate and to adjust the pH of the reaction mass so that one mole of the sodium salt is converted to lactic acid.

Instead of the chloro derivatives of hydroxypropane, I may employ the corresponding bromine derivatives in any of the foregoing reactions.

In place of employing 1,3 dichloropropanol-2 it is entirely practical to prepare lactic acid esters from the allyl halide, from which the chlorohydrin is ordinarily made by hypohalogenation. Thus allyl lactate, which is a useful intermediate for the manufacture of plastics, can be prepared in accordance with the following reaction:

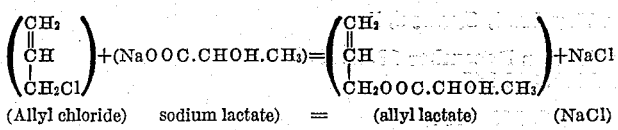

(Allyl chloride)   sodium lactate)   =   (allyl lactate)   (NaCl)

I have also found that chloro alkanes may be used to advantage in the preparation of lactic acid esters. Thus, dichloroethane may be condensed with two moles of sodium lactate to produce a valuable plasticizer, glycol dilactate, as shown below:

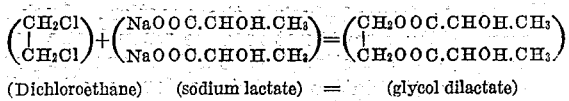

(Dichloroethane)   (sodium lactate)   =   (glycol dilactate)

The following examples are used to illustrate the principles of my invention and it is to be clearly understood that the proportions of materials, temperatures of reaction, and the method of isolating the products may be varied widely without departing from the spirit and scope of my invention.

*Example 1.*—In a one liter three-necked round bottom flask fitted with a liquid-sealed stirrer and reflux condenser are placed 129 grams (1 mole) of 1,3 dichloropropanol-2 and 373 (2 moles) of a 60% aqueous solution of sodium lactate. The mixture is heated by means of an oil bath maintained at a temperature of approximately 160 degrees C and stirred while refluxing for a period of three hours. By that time a considerable amount of sodium chloride will have separated.

The water is then adjusted in the reflux condenser to allow water vapor to be expelled. The temperature of the oil bath may be raised to increase the rate of the removal of water by distillation. When no more sodium chloride separates, the reaction mass is filtered while still warm by means of the suction filter. The product, which in this example would be glycerol dilactate, is a clear viscous liquid with a slight amber tinge and is suitable for use in the formation of alkyd resins.

As illustrating a method of employing the glycerol dilactate produced in accordance with the foregoing Example 1, in the production of an alkyd, the following procedure may be carried out. The esterification of the glycerol dilactate as prepared in the preceding example is accomplished by mixing two equivalents of the glycerol dilactate and three equivalents of a dicarboxylic acid, such as sebacic acid, in a three-necked flask fitted with a carbon dioxide inlet capillary and thermometer, which dips into the reaction mixture, and a short necked distilling head which in turn is connected to the condenser and receiver. The flask is heated with an oil bath to maintain a temperature in the flask of approximately 180 degrees C. During the course of the reaction, the pressure in the system is gradually decreased below atmospheric pressure by means of a pump connected to the system, in order to keep the contents boiling vigorously. After several hours signs of gelation begin to appear. The heat is removed and after a time the product in the form of an alkyd is poured from the flask as the desired material.

*Example 2.*—In a one liter, three-necked flask fitted with a liquid-sealed stirrer and a fractionating column is placed 129 grams (1 mole) of 1,3 dichloropropanol 2. The flask is heated by means of an oil bath while 373 grams (2 moles) of a 60% aqueous solution of sodium lactate is added by means of a dropping funnel with a large bore delivery tube. The rate at which the solution of sodium lactate is added is such that the water is distilled from the reaction mass at about the same rate at which it is added. When all the sodium lactate solution has been added, the heating is continued until no more sodium chloride separates, after which the material is filtered and recovered as illustrated in Example 1 in the form of glycerol dilactate.

*Example 3.*—With the apparatus and in accordance with the procedure outlined in either of Examples 1 and 2, an excess of 1,3 dichloropropanol 2 is used. The reaction is continued for three hours and the excess 1,3 dichloropropanol 2 with any water which may be present is distilled under vacuum to leave glycerol dilactate and sodium chloride which is then filtered and the glycerol dilactate recovered as given in the preceding examples.

*Example 4.*—In the apparatus described in previous examples is placed 1 mole of 1,3 dichloropropanol 2 and a molal quantity of dehydrated, powdered calcium lactate is slowly added. The reaction requires more time than with sodium lactate and in order to facilitate the separation of the calcium chloride, sodium carbonate may be added to the product, after which the glycerol dilactate may be obtained by filtration.

In the Example 3, involving the use of an excess of a halogeno compound and then distilling such excess from the vessel, I have found that the reaction time may be reduced considerably. The halogeno compound is recovered and added to the next batch with the addition of an amount of fresh halogeno compound as may be required to give the requisite quantity. By shortening the reaction time, I have found that the resultant esters are lighter in color. Furthermore, I point out that this procedure is unlike the esterification of lactic acid with polyhydric alcohols, since it is here possible to remove easily the excess of halogeno compound at the close of the condensation reaction. Also, I might point out that in the final step the precipitated sodium chloride is filtered out together with other impurities which may have been rendered insoluble by this electrolyte.

What is claimed as new and useful is:
1. A process for the production of lactic acid esters of glycerol, which comprises condensing a glycerol dihalohydrin with an alkali salt of lactic acid.

2. A process for the production of lactic acid esters of glycerol, which comprises condensing a glycerol dihalohydrin with a compound selected from the group consisting of sodium lactate, potassium lactate, barium lactate and calcium lactate.

3. A process for the production of glycerol dilactate which comprises condensing 1,3-dichloropropanol-2 with an alkali lactate.

4. A process for the production of glycerol dilactate which comprises condensing 1 mole of 1,3-dichloropropanol-2 with 2 moles of an alkali salt of lactic acid containing about 40% by weight of water, refluxing the ingredients until the reaction is complete, and then distilling off the water and filtering off the precipitated alkali chloride along with any other insoluble impurities.

GEORGE GORDON URQUHART.